United States Patent [19]

Heinemann et al.

[11] Patent Number: 4,936,548
[45] Date of Patent: Jun. 26, 1990

[54] ROTARY GATE VALVE ARRANGEMENT

[75] Inventors: Otto Heinemann, Ennigerloh; Dietrich Kornetzky; Ludger Thöne, both of Oelde; Hans-Joachim Golz, Ahlen, all of Fed. Rep. of Germany

[73] Assignee: Krupp Polysius AG, Fed. Rep. of Germany

[21] Appl. No.: 306,634

[22] Filed: Feb. 3, 1989

[30] Foreign Application Priority Data

Feb. 11, 1988 [DE] Fed. Rep. of Germany ....... 3804271

[51] Int. Cl.$^5$ .............................................. F16K 5/04
[52] U.S. Cl. ..................................... 251/316; 251/362
[58] Field of Search ............... 251/316, 314, 362, 363, 251/360, 315, 309

[56] References Cited

U.S. PATENT DOCUMENTS

| | | | |
|---|---|---|---|
| 3,233,865 | 2/1966 | Panzica et al. | 251/309 |
| 3,412,975 | 11/1968 | Kurkjian | 251/362 |
| 4,150,811 | 4/1979 | Condit | 251/315 |
| 4,180,244 | 12/1979 | Rosenitsch | 251/309 |
| 4,474,205 | 10/1984 | Dreyer et al. | 251/328 |
| 4,491,144 | 1/1985 | Dreyer et al. | 251/328 |
| 4,527,773 | 7/1985 | Müller et al. | 251/362 |
| 4,660,805 | 4/1987 | Hahn et al. | 251/326 |
| 4,697,786 | 10/1987 | Kennedy | 251/309 |

FOREIGN PATENT DOCUMENTS 988840 8/1951 France ................... 251/316

Primary Examiner—John Rivell
Assistant Examiner—L. R. Leo
Attorney, Agent, or Firm—Learman & McCulloch

[57] ABSTRACT

The invention relates to a rotary gate valve arrangement with a gate valve housing, a rotatably mounted gate valve rotor arranged therein at right angles to the material flow direction and having a part-cylindrical sliding part which co-operates with a sealing arrangement containing a cassette-like rectangular sealing frame with a sealing element running around it, the sealing frame being received in the receiving channel formed in the housing in such a way that through flow of material is unimpeded and the sealing frame can be simply and quickly inserted and withdrawn without the removal of essential parts of the rotary gate valve.

10 Claims, 3 Drawing Sheets

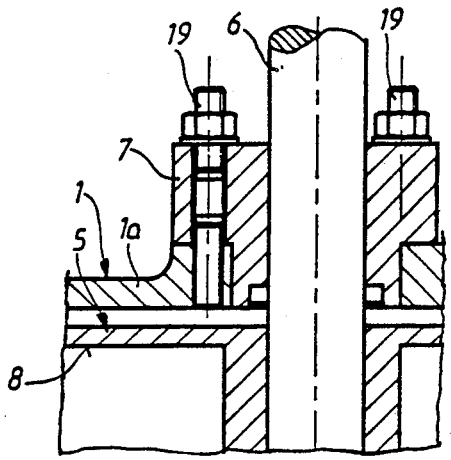
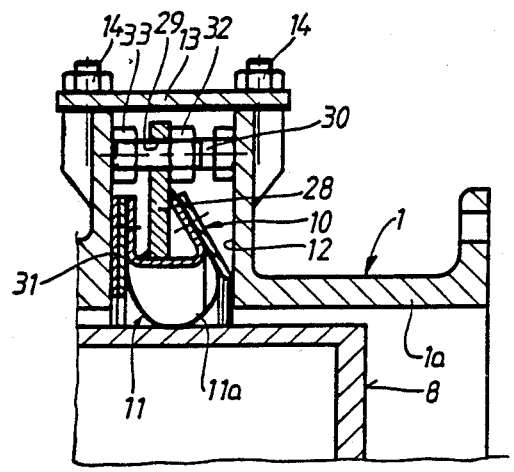
FIG. 3              FIG. 4
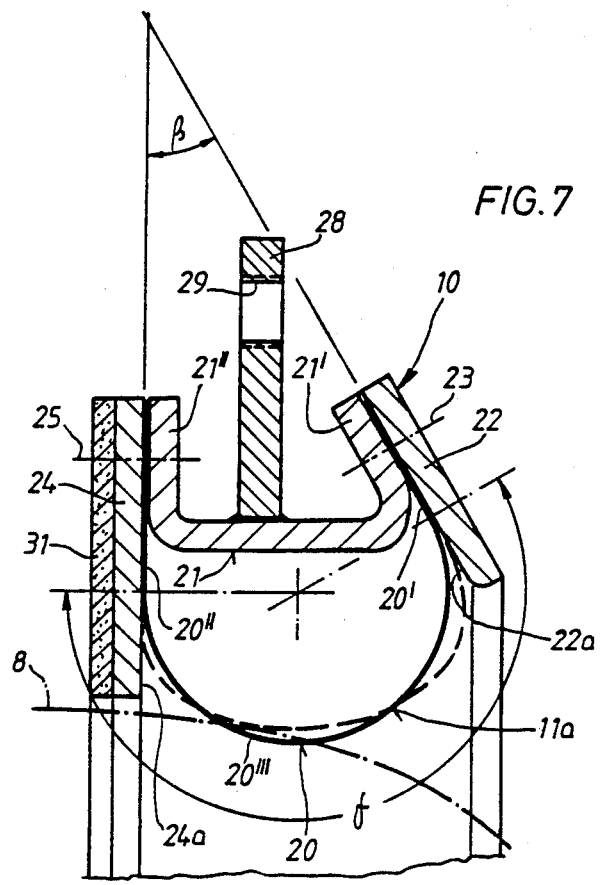
FIG. 7

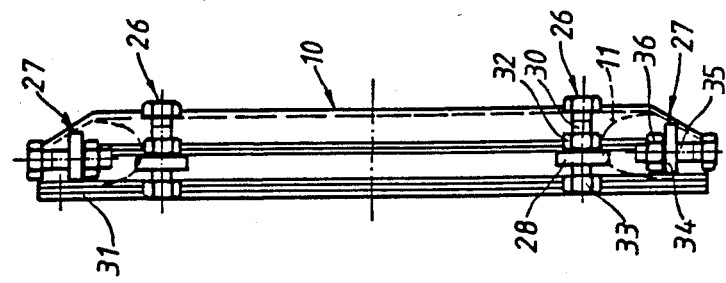
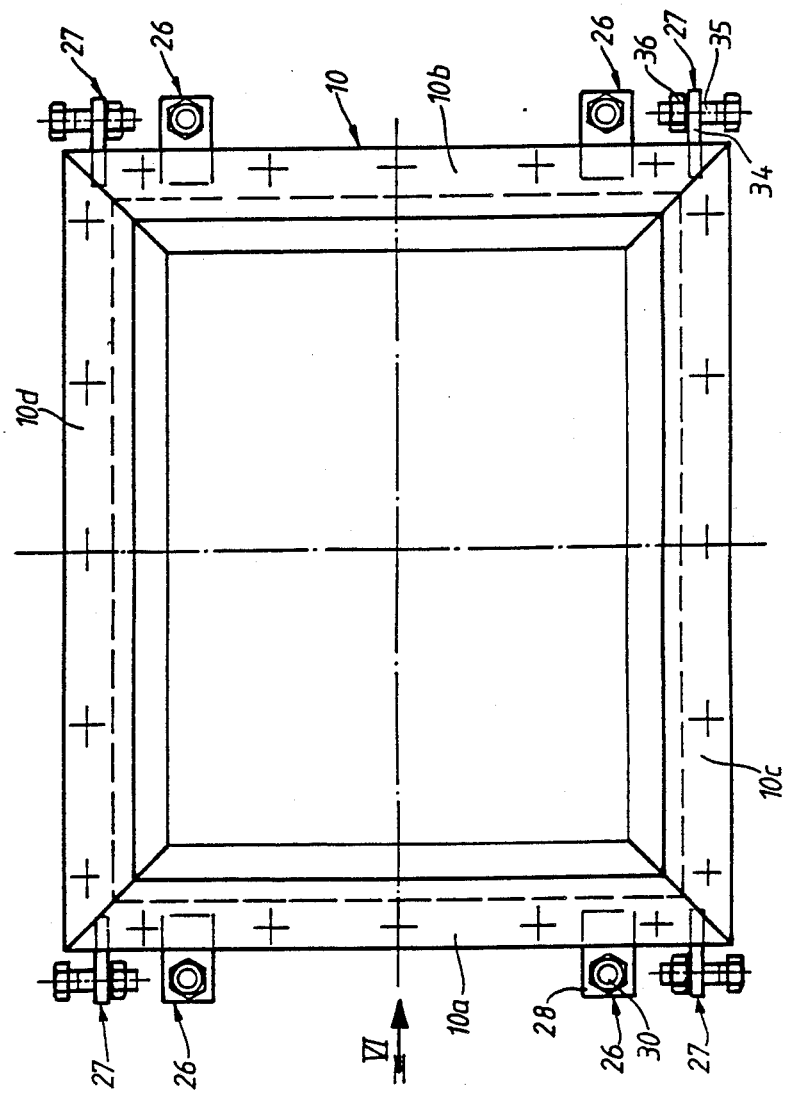

ROTARY GATE VALVE ARRANGEMENT

The invention relates to a rotary gate valve arrangement for the straight through flow of material, particularly powdery and fine-grained bulk material, the valve incorporating an improved sealing element design and mounting thereof as well as improvements in valve housing design.

BACKGROUND OF THE INVENTION

Rotary gate valves of various forms are used both as pure shut-off valves and as flow-regulating valves. These rotary gate valves are used particularly frequently below the outlets of bulk material silos, in conveyor pipes, in pneumatic conveyor troughs and channels and the like.

In these known constructions a multi-part gate valve housing is generally provided in which a gate valve rotor is arranged so that it extends at right angles to the material flow direction, its shaft being rotatably mounted in opposing side walls of the housing, and it has an approximately part-cylindrical sliding part which serves as the actual shut-off or flow-regulating element for the flow passage cross-section. This rotor can be rotated about its shaft in the desired manner by hand or by a motor. A sealing arrangement which co-operates with the outside of the said sliding part to form a seal is also located inside the gate valve housing. Such a sealing arrangement usually has sealing elements which are made from metal or elastic materials and should butt against the moving surfaces of the sliding part by sliding or rubbing and form a seal. Therefore all the sealing elements are subject to more or less great wear and thus have to be adjusted or replaced relatively frequently. In the known rotary gate valve arrangements, in order to replace the sealing elements intermediate pieces (compensators or the like) have to be removed and sealing flanges dismantled, which is frequently very costly and awkward.

In addition, in the known rotary gate valve arrangements, because of the construction of the sealing arrangements and sealing elements, there are parapet-like steps which inhibit the flow of material through the housing. In the case of gate valve housings which are arranged approximately horizontally or slightly inclined and are constructed like pneumatic conveyor channels this is a particular disadvantage because only an insufficiently large total region of the housing base can be constructed for the admission of aerating air.

SUMMARY OF THE INVENTION

The object of the invention, therefore, is to provide a rotary gate valve arrangement which is a relatively simple and efficient construction permitting easy and quick assembly and dismantling of the sealing arrangement and also providing a gate valve housing constructed like a pneumatic conveyor channel with the greatest possible air-permeable base area.

In the construction according to the invention the sealing arrangement is formed essentially by a cassette-like rectangular sealing frame with a sealing element which extends over the four rectangular sides of the frame arranged in it, and this sealing frame is arranged and retained in a receiving channel formed in the gate valve housing in which the sealing frame as a whole, i.e. as a sealing frame unit, can be inserted (pushed in) from the exterior and if necessary taken out again (withdrawn), and therefore if necessary the actual sealing element can be set in again or replaced extremely quickly and simply. In this construction according to the invention all the rectangular sides of the sealing frame can be arranged and retained in corresponding sections of the receiving channel in such a way that they are largely countersunk with respect to the flow passage cross-section in the gate valve housing, so that optimum flow conditions are produced in this gate valve housing for the material to be conveyed through it. However, at the same time this is also a good prerequisite for a gate valve housing which is arranged approxiamtely horizontally to be constructed with its base largely free of steps and provided with the greatest possible base aeration area.

THE DRAWINGS

The invention will be explained below with the aid of the drawings, in which:

FIGS. 3 and 4 show enlarged sectional detail views approximately along the lines III—III and IV—IV in FIG. 1;

FIG. 5 shows an overall view of the sealing frame;

FIG. 6 shows a side view of the sealing frame, approximately according to the arrow VI in FIG. 5;

FIG. 7 shows a sectional detail view through the sealing frame on an enlarged scale.

DETAILED DESCRIPTION

The general construction of the rotary gate valve arrangement will be explained first of all with the aid of FIGS. 1 and 2. This rotary gate valve arrangement is intended above all for the straight through flow of powdery and fine-grained bulk material.

Figure 1:
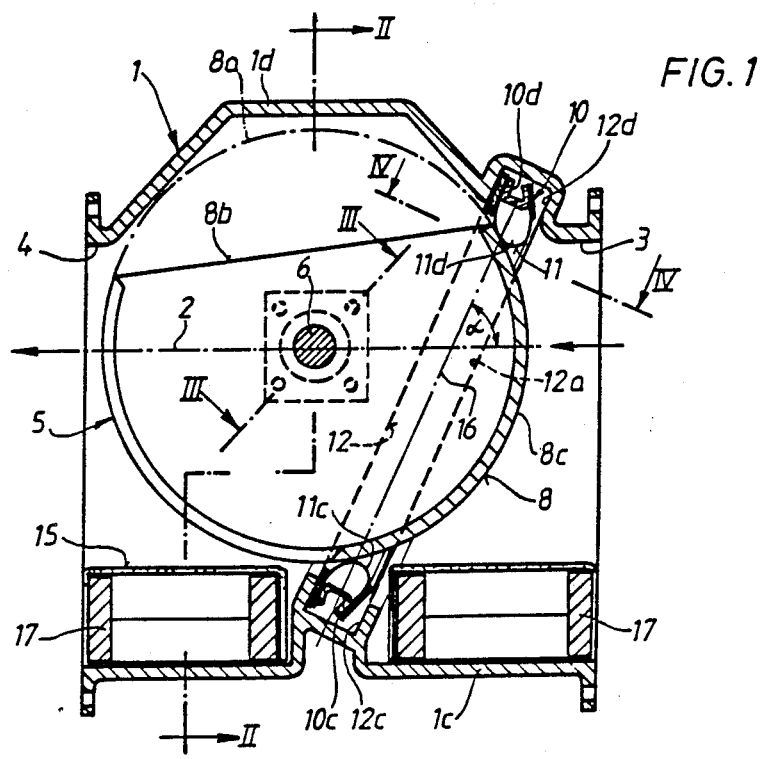
FIG. 1 shows a cross-sectional view through the rotary gate valve arrangement, approximately along the line I—I in FIG. 2.
Figure 2:
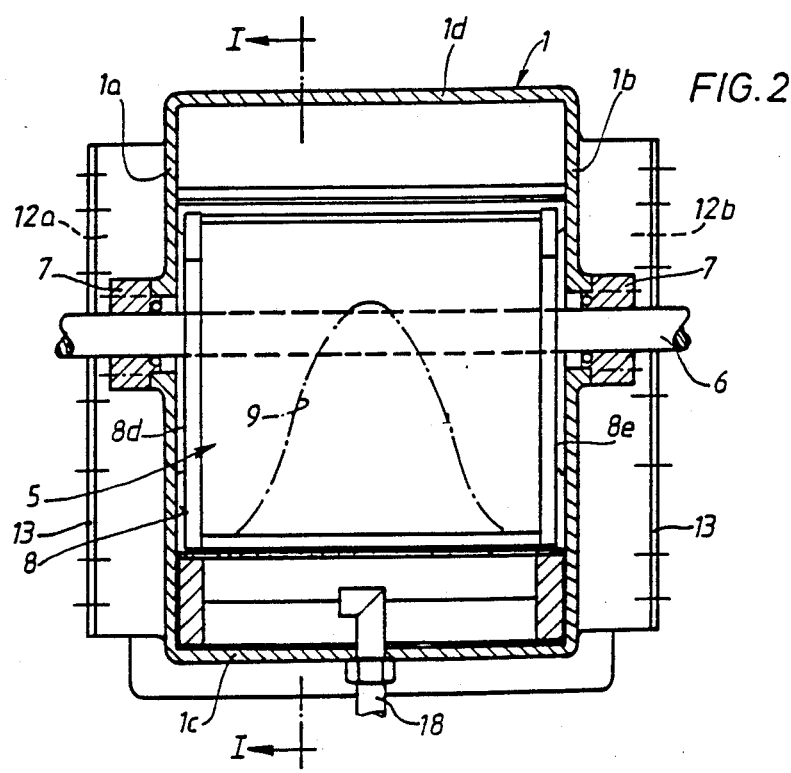
FIG. 2 shows a vertical sectional view along the line II—II in FIG. 1.

The rotary gate valve arrangement contains a gate valve housing 1 which—as can be seen from FIG. 2—has a rectangular flow passage cross-section so that it is constructed approximately in the form of a tubular conveyor channel through which the bulk material to be conveyed flows in the direction of the dash-dot line 2 provided with directional arrows (material flow direction). The gate valve housing 1 has an inlet opening 3 and an outlet opening 4 which lies opposite this inlet opening. Four housing walls which define the rectangular cross-section, namely two opposing side walls 1a, 1b and a base wall 1c and a top wall 1d extend between these two openings 3 and 4, and the gate valve housing 1 with its walls 1a to 1d can be produced in one piece as a relatively simple casting which can be finished in one work-mounting and in which the surfaces to be machined only set limited requirements on the quality of the surface. Flanges can be formed on the ends in the region of the inlet and outlet openings 3, 4 in the usual way—as indicated in FIG. 1—for connection to conveyor channels or the like which are arranged upstream or downstream.

A gate valve rotor 5 which extends at right angles to the material flow direction 2 and is supported by its shaft 6 in a bearing 7 in each of the opposing side walls 1a and 1b so as to be rotatable (this will be dealt with in greater detail later). Inside the gate valve housing 1 the rotor 5 has a part-cylindrical sliding part 8 which is known per se, is arranged concentrically with respect to the shaft 6 and serves in a conventional manner to shut off the flow passage cross-section of the housing 1 partially or completely in case of need. This sliding part can—as indicated in FIG. 1—be constructed as a part-cylindrical drum body (hollow body) or as a part-cylindrical roll body (hollow roll or solid roll) and con optionally also be constructed with a flow opening 9 specially formed in it which is only indicated by a dash-dot line in FIG. 2 and is used in particular when this rotary gate valve arrangement is to be used as a flow-regulating rotary gate valve.

It should also be noted in FIG. 1 that the sliding part 8 is greater in diameter than the internal flow passage cross-section of the gate valve housing 2, so that the top housing wall 1d is widened (bulges) towards the top to adapt it to the turning circle 8a of the sliding part 8 which is only indicated by a dash-dot line. With regard to the part-cylindrical construction of the sliding part 8 it should be mentioned that this construction is produced in the usual way by cutting off a segment portion (based on the circular cross-section) from an imagined full cylinder so that a sort of chord surface 8b is produced as shown in FIG. 1, and this again will be dealt with later.

If one studies the representaion in FIG. 1, then in the gate valve housing 1 there is also a sealing arrangement which is formed essentially by a sealing frame 10. This sealing arrangement co-operates with the exterior, that is to say both with the outer peripheral face and with the closed end faces of the sliding part 8, in order to achieve a sufficient seal against a through flow of material, and this sealing frame 10 co-operates with the outer peripheral face of the sliding part 8 facing the inlet opening 3.

As will be explained in greater detail below with the aid of FIGS. 4 to 6, the sealing frame 10 is of rectangular and cassette-like construction (of, FIG. 5). It is provided with a sealing element 11 which extends over its four rectangular sides 10a, 10b, 10c and 10d and which is in or can be brought into sprung engagement with the part-cylindrical outer peripheral face 8c and the end faces 8d and 8e of the sliding part 8.

A receiving channel 12 which runs around the periphery of the housing 1 and is open towards the interior of the housing is formed in the four walls 1a to 1d of the gate valve housing to receive the sealing frame 10. This receiving channel 12 is composed of four channel sections 12a to 12d which are each joined directly to one another and of which one is located in each of the four housing walls 1a to 1d. Whereas in the illustrated embodiment the two receiving channel sections 12c and 12d formed in the base wall 1c and in the top wall 1d have an approximately U-shaped cross-section (of FIG. 1), which is formed completely by the casting of the gate valve housing 1 (in one piece), the two receiving channel sections 12a and 12b in the two opposing side walls of the housing 1a and 1b have releasably fixed base plates 13 (of, FIGS. 2 and 4) so that a housing slot which is accessible from the exterior is produced in each of these two side walls 1a and 1b by the receiving channel sections 12a and 12b in such a way that the sealing frame 10 can be inserted into the receiving channel 12 (pushed in) from the exterior or taken out (withdrawn), and as a result both assembly and dismantling of the sealing frame 10 and—if necessary—replacement of the sealing frame, especially its sealing element 11, can be carried out extremely quickly and simply. The said base plates 13 for external closure of the two opposing receiving channel sections 12a and 12b can be releasably fixed by means of screws and nuts, as indicated in FIG. 4 at 14.

As regards the arrangement of the sealing frame 10 (and thus also the construction of the receiving channel 12) in the gate valve housing 1, this could basically be achieved in any suitable manner, for example the sealing frame 10 could be arranged approximately vertically in any suitable association with the sliding part 8 or also in any suitable manner at an angle to the material flow direction 2. However, with an approxiamtely flat construction of the sealing frame an approximately parapet-like step must be expected in the region of the base of the gate valve housing before the sliding part 8, as a result of which the through flow of material is then impeded.

In the embodiment illustrated in FIGS. 1 and 2 it may be assumed—as already mentioned to some extent—that the gate valve housing 1 is constructed in the form of an approximately horizontal pneumatic conveyor channel with an air-permeable base (aerated base 15). The sealing frame 10 with its sealing element 11 forms a sealing plane 16 (of FIG. 1) which extends substantially parallel to the shaft of the gate valve rotor 5 and is determined essentially by the lines of contact on sealing engagement between the sealing element 11 and the sliding part 8. In this embodiment the sealing frame 10 is preferably arranged at an angle in the manner shown in FIG. 1 in such a way that the said sealing plane 16 encloses an acute angle $a$ with the flow direction 2 which is essentially horizontal. This angled positon is chosen so that the upper rectangular side 10d of the sealing frame 10 is received in the appertaining section of the receiving channel 12d in such a way that the longitudinal section 11d of the sealing element 11 located there lies almost in the plane of the inner face of the top wall 1d of the housing in the region of the inlet opening 3, whereas the lower rectangular side 10c of the sealing frame 10 received in the lower section 12c of the receiving channel is located approximately in the region below the gate valve rotor shaft 6, and the elastically deformable sealing engagement surface of the lower longitudinal section 11c of the sealing element lies approximately in the plane of the inner face of the base wall 1c of the housing or slightly above it, i.e. in the illustrated embodiment the said plane of the inner face of the base wall 1c of the housing is determined by the aerated base 15. When viewed in the material flow direction 2 in FIG. 1, aerating boxes 17 which form the inner face of the base wall 1c of the housing are connected directly on both sides of the lower rectangular side 10c of the sealing frame and are connected by short pipes 18 to an aeration pipe system in a manner which is known per se. This angled arrangement of the sealing frame 10 in the gate valve housing 1 permits optimum through flow of the material, and the inner face of the base wall 1c of the housing, i.e. the aerated base 15 of the aerating boxes 17, is practically free of any parapet-like step.

The angled position of the sealing frame 10 which is described above also fits together with the cross-sectional construction of the sliding part 8, i.e. the chord or chord surface 8b of the sliding part 8 is chosen so that in the corresponding rotated positon of the sliding part 8 it runs parallel to the sealing plane 16 or the surface of the sliding frame facing it and in this position permits unhindered assembly and dismantling of the sealing frame 10 without the sliding part 8 or the whole gate valve rotor 5 having to be removed for the purpose.

In FIG. 3 one possibility is shown of how the ends of the shaft 6 of the gate valve rotor 5 can be rotatably mounted in the side walls 1a and 1b of the gate valve housing 1. The shaft 6 can be formed by a continuous shaft or also by axle journals. The bearings 7 which are provided for the rotatable support of the two ends of this shaft 6 are preferably constructed—as is known per se—as armoured plastic bearings which are releasably fixed by means of screws 19 onto the appertaining side walls 1a, 1b of the gate valve housing 1. When wear occurs these plastic bearings 7 can be adjusted in a known manner and turned into another stressing position, and in case of need their fixing screws 19 are loosened somewhat and they are thereby rotated somewhat about the shaft 6.

Particular importance is also given to the construction of the sealing element 11 of the sealing frame 10. Although this sealing element could basically be made from any suitable sealing material, it is however preferred for this sealing element 11—as already indicated above—to be divided into longitudinal sections 11a to 11d which are adapted to the rectangular sides 10 to 10d of the sealing frame 10 and for each of these longitudinal sections 11a to 11d—as shown in FIG. 7—to be made from a spring steel strip which in cross-section is bent approximately into a U shape. All the longitudinal sections 11a to 11d of the spring element are basically of the same construction and can differ merely in their length, so that only the construction of the longitudinal section 11a is explained with the aid of FIG. 7.

The arms of the U-shaped spring steel strip 20 are firmly clamped at their free ends 20', 20''. The end 20' is clamped between the arm 21' of a retaining profile 21 and a strip-shaped outer clamping element 22 by means of a screw connection 23 which is merely indicated, whereas the other end 20'' of the spring steel strip 20 is clamped between a second arm 21'' of the retaining profile 21 and a second strip-shaped outer clamping element 24 by means of a screw connection 25. The retaining profile 21 and the two outer clamping elements 22, 24 are parts of the sealing frame 10.

The two arms 21', 21'' of the retaining profile 21 are bent in such a way that they enclose an acute angle $\beta$ which can be approximately 15° to 45° (approximately 30° in the illustrated embodiment), which results in a clamping angle $\gamma$ between 200° and 225° (approximately 210° in the illustrated embodiment) for the spring steel strip 20 (as the actual sealing element).

The two outer clamping elements 22 and 24 are extended beyond the clamping zones, i.e. beyond the length of the arms 21', 21'' of the retaining profile 21 in the direction of the free central portion of the spring steel strip 20 where they form rolling surfaces 22a, 24a which extend tangentially with respect to the clamped ends 20', 20'' of the spring steel strip 20. The spring steel strip 20 comes into contact with the sliding part 8 to be sealed off (only indicated by a dash-dot line in FIG. 7) approximately in the said central region between the two clamping points, and is thereby deformed in the manner indicated by a broken line. If the central zone 20''' of the spring steel strip 20 is pressed inwards (in the direction of the retaining profile 21) then the spring steel strip 20 rests with the zones adjoining the clamped ends 20', 20'' on the said rolling surfaces 22a, 24a. Thus these rolling surfaces limit the deformability of the two arms of the spring steel strip 20 towards the exterior and prevent it from snapping.

Thus the sealing element 11 of the sealing frame 10 which is constructed in the manner described above is self-adjusting in its metal-elastic construction and extremely resistant to wear.

There is a further special feature which should be pointed out with regard to the sealing frame. This sealing frame 10 has on its outer periphery on both rectangular sides 10 and 10b, with which the receiving channel sections 12a, 12b provided with releasable base plates 13 are associated, various arrangments 26, 27 for aligning and clamping the sealing element 11 and the sealing frame 10 in the receiving channel 12. These arrangements 26, 27 are preferably arranged in the proximity of the corners of the sealing frame on the said rectangular sides 10a and 10b as is shown in detail in FIGS. 5 and 6.

Each arrangement 26 has a lug 28 which is welded onto the sealing frame 10 and projects approximately at right angles and—cf, also FIGS. 4 and 7—has a threaded bore passing through it in which a set screw 30 is arranged. By turning this set screw 30 the sealing frame 10 can be clamped in the receiving channel 12 in the manner shown in FIG. 4. At the same time an elastic seal 31, which is preferably made from a silicone foam sealing strip, is provided on one outer face of the sealing frame 10 and in the assembled state is provided between this sealing frame and the receiving channel 12, is compressed to form a seal, so that a reliable seal is formed between the sealing frame 10 and the gate valve housing 1. The set screw 30 can also be fixed in its set position with the aid of a lock nut 32. The cassette-like sealing frame is also fixed in the receiving channel 12 with the aid of a further lock nut 33 which rests against the corresponding inner face of the receiving channel 12.

Each arrangement 27 is also fixed on the sealing frame 10 by means of a lug 34 which projects approximately at right angles from this sealing frame, these lugs 34 being aligned at right angles to the first lugs 28 of the arrangements 26. These arrangements 27 serve prinicipally to align the sealing frame 10 with its sealing element 11 with respect to the sliding part 8 of the gate valve rotor 5. Each aligning arrangement 27 also contains a set screw 35 which can be fixed with the aid of a lock nut 36.

Although the rotary gate valve arrangement has been explained with the aid of drawings principally in a construction in which the gate valve housing extends approxiamtely horizontally and is constructed like a pneumatic conveyor channel or a pneumatic conveyor trough, it is generally also possible for this rotary gate valve arrangement to be installed so that it is more or less sharply inclined or even in case of need approximately vertical, i.e. with the material flow more or less sharply inclined or approximately vertical, for example it could be installed in any conveyor pipe or even below a container outlet.

What is claimed

1. A rotary gate valve comprising a valve housing defining a material flow-through passageway having inlet and outlet openings, said passageway being of generally uniform configuration throughout to establish a meterial flow path which is linear and unimpeded, a gate valve rotor rotatably mounted in said housing and extending across said passageway between said inlet and outlet openings to control material flow therethrough, a sealing frame receiving channel in said housing and extending completely about said passageway adjacent said inlet opening and said rotor, a sealing frame removably received in said channel and including a series of continuously aligned sealing element means facing inwardly from said channel toward said passageway, said rotor being provided with a part-cylindrical outer face portion adapted for engagement with said sealing element means, and sealing frame access means forming a part of said housing in association with said channel to permit ready insertion and withdrawl of said sealing frame into and out of said channel, said channel and said sealing frame being positioned and dimensioned relative to said passageway to maintain the linear and unimpeded character of said flow path.

2. The rotary gate valve of claim 1 wherein said housing further includes aerating means along at least the bottom area of said passageway whereby material movement along said flow path is assisted.

3. The rotary gate valve of claim 2 wherein said channel is inclined at an acute angle relative to said material flow path with the portion thereof adjacent said aerating means dividing said aerating means into inlet and outlet aerating portions which cooperatively enhance material flow along said flow path.

4. The rotary gate valve of claim 1 wherein said housing is of generally rectangular configuration providing substantially vertically spaced top and bottom walls and substantially horizontally spaced side walls, said channel being formed from peripherally aligned inwardly opening U-shaped portions extending along each of said walls, said access means being in the form of a removable plate defining the base of a U-shaped portion along at least one of said walls.

5. The rotary gate valve of claim 4 wherein said sealing frame is provided with adjustable alignment and positioning means to locate said sealing frame for efficient engagement of said sealing element means with said outer face portion of said rotor.

6. The rotary gate valve of claim 1 wherein said sealing element means includes a spring strip bent into an approximate U-shape and clamped at its free ends to spaced arms forming a part of said sealing frame, the outer surface of the centrally bowed portion of said strip being adapted for engagement with said outer face portion of said rotor.

7. The rotary gate valve of claim 1 wherein said rotor includes a shaft supported by said housing, and journal means engaging said shaft and including adjustable armoured plastic bearings to accommodate wear of said journal means.

8. The rotary gate valve of claim 3 wherein said sealing frame is provided with adjustable alignment and positioning means to locate said frame for efficient engagement of said sealing element means with said outer face portion of said rotor.

9. The rotary gate valve of claim 8 including a deformable sealing means positioned between said sealing frame and said channel.

10. The rotary gate valve of claim 9 wherein said channel is integrally formed in said housing.

* * * * *